United States Patent
Mayer et al.

(10) Patent No.: US 9,458,029 B2
(45) Date of Patent: Oct. 4, 2016

(54) SEPARATOR FOR SEPARATING A LIGHT LIQUID-WATER MIXTURE AND METHOD FOR SEPARATING A LIGHT LIQUID-WATER MIXTURE

(75) Inventors: Hermann Mayer, Ladenburg (DE); Marc Schmitz, Mannheim (DE); Stefan Grube, Lampertheim (DE); Libor Docekal, Zd'ár nad Sázavou (CZ)

(73) Assignee: ACO Severin Ahlmann GmbH & Co., KG, Rendsburg (DE)

( * ) Notice: Subject to any disclaimer, the term of this patent is extended or adjusted under 35 U.S.C. 154(b) by 785 days.

(21) Appl. No.: 13/821,348

(22) PCT Filed: Sep. 7, 2011

(86) PCT No.: PCT/EP2011/065448
§ 371 (c)(1),
(2), (4) Date: May 28, 2013

(87) PCT Pub. No.: WO2012/032079
PCT Pub. Date: Mar. 15, 2012

(65) Prior Publication Data
US 2013/0306577 A1    Nov. 21, 2013

(30) Foreign Application Priority Data

Sep. 10, 2010  (DE) .......................... 10 2010 037 455
Jun. 8, 2011  (DE) .......................... 10 2011 050 939

(51) Int. Cl.
*C02F 1/00*  (2006.01)
*B01D 17/02*  (2006.01)

(52) U.S. Cl.
CPC ........... *C02F 1/006* (2013.01); *B01D 17/0211* (2013.01)

(58) Field of Classification Search
CPC ............................ C02F 1/006; B01D 17/0211
See application file for complete search history.

(56) References Cited

U.S. PATENT DOCUMENTS 3,503,514 A    3/1970  Lawson

FOREIGN PATENT DOCUMENTS

DE    419360 C    9/1925
DE    9002232 U1    5/1990
(Continued)

OTHER PUBLICATIONS

English Translation of International Preliminary Report on Patentability and Written Opinion for PCT Application No. PCT/EP2011/065448, dated Mar. 12, 2013, 8 pages.
(Continued)

*Primary Examiner* — David A Reifsnyder
(74) *Attorney, Agent, or Firm* — Westman, Champlin & Koehler, P.A.

(57) ABSTRACT

A separator is indicated, which is arranged in a container having a circular or ellipsoidal cross section and having a container wall, for separating a light liquid-water mixture, for example oil-polluted water, comprising: a feed arranged on a first side of the container having a feed chicane, which directs the supplied mixture downward and divides it into two first flow parts that are substantially of equal size, an outlet having an outlet tube, a circular or ellipsoidal flow wall having an internal wall side and an external wall side, wherein the flow wall passes through at least half of a full circle, preferably at least three quarters of a full circle, and has an opening, which is facing a second side of the container opposite the feed, wherein the flow wall between the external wall side of the flow wall and the container wall forms two flow channels at two opposite sides of the container wall in each case from the feed to the second side of the container, wherein in the flow channels in each case one of the two first flow parts is conducted from the feed to the second side of the container along the container wall, wherein the two first flow parts at the second side of the container having substantially opposite directions of flow meet one another and are reunited, and hole elements arranged in the two flow channels through which the two first flow parts flow.

16 Claims, 7 Drawing Sheets

(56) References Cited

FOREIGN PATENT DOCUMENTS

Figure 11:
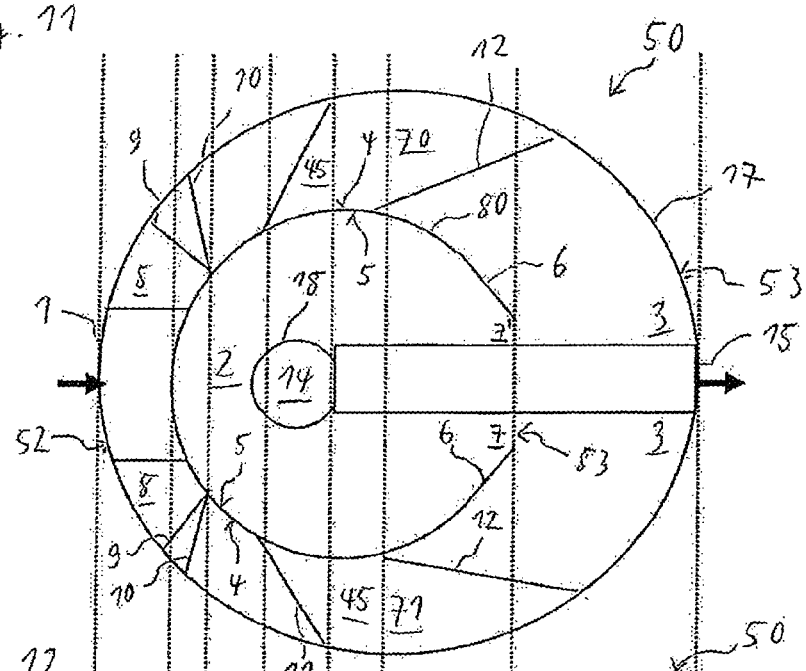

| DE | 9112933 | U1 | 3/1992 |
| DE | 4122902 | A1 | 1/1993 |
| DE | 4308841 | A1 | 9/1994 |
| EP | 0522265 | A2 | 1/1993 |
| EP | 0522265 | A3 | 1/1993 |
| EP | 0820796 | A2 | 1/1998 |
| EP | 0820796 | A3 | 7/1998 |
| UA | 27 468 | U | 10/2007 |

OTHER PUBLICATIONS

International Search Report for PCT Application No. PCT/EP2011/065488, dated Dec. 7, 2011.
Office Action for DE Application No. 102011050939.9, dated Jan. 16, 2012.
First Office Action for Russian Patent Application No. 2013115830, dated May 7, 2015, 10 pages.

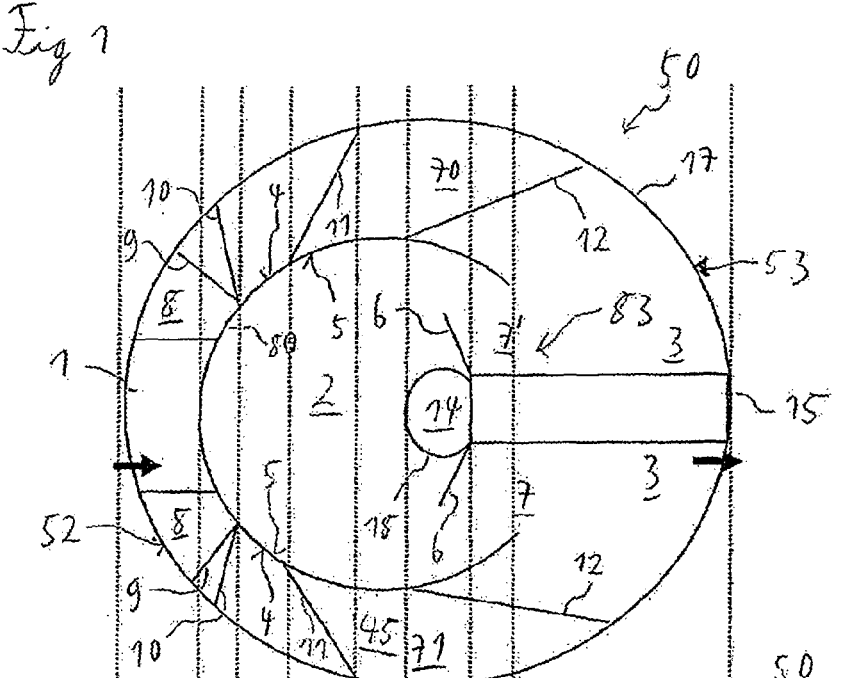
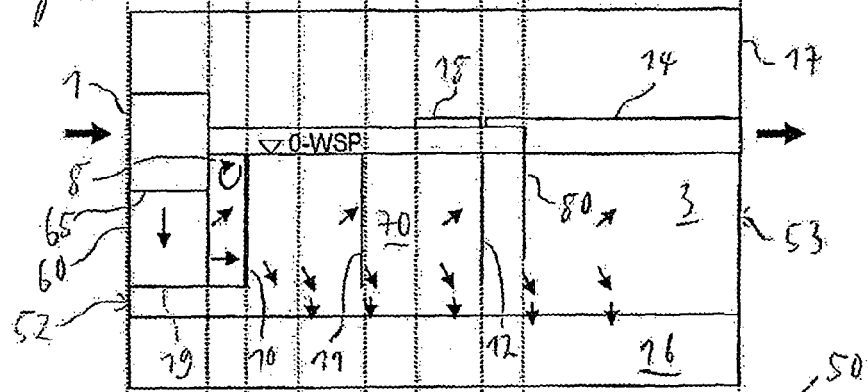
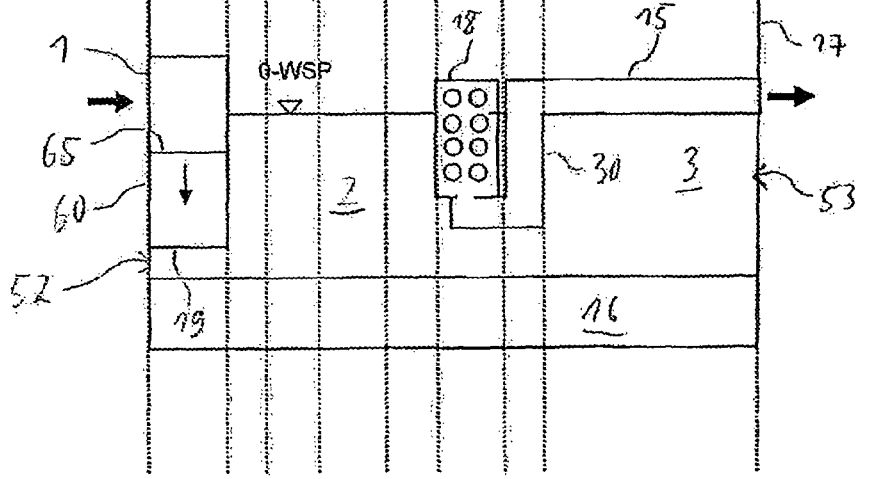

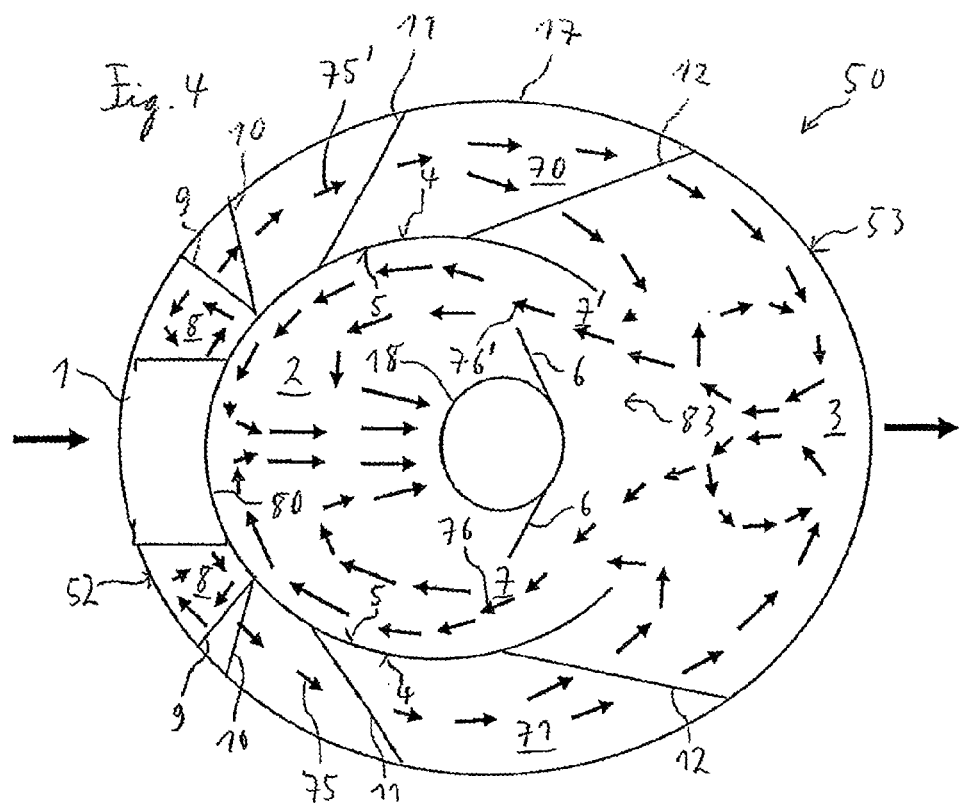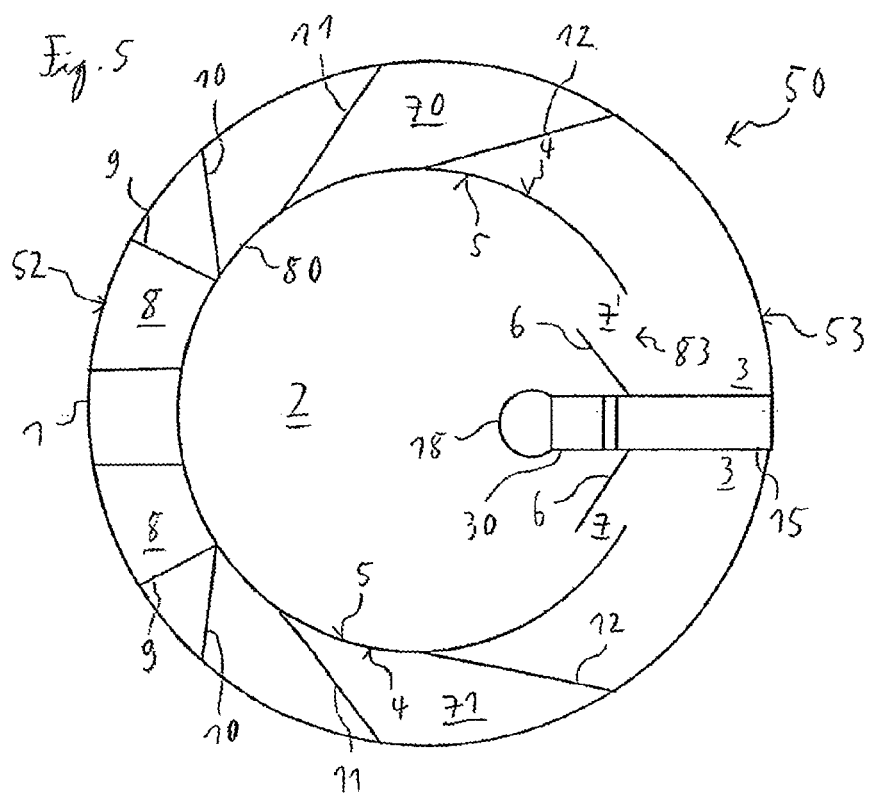

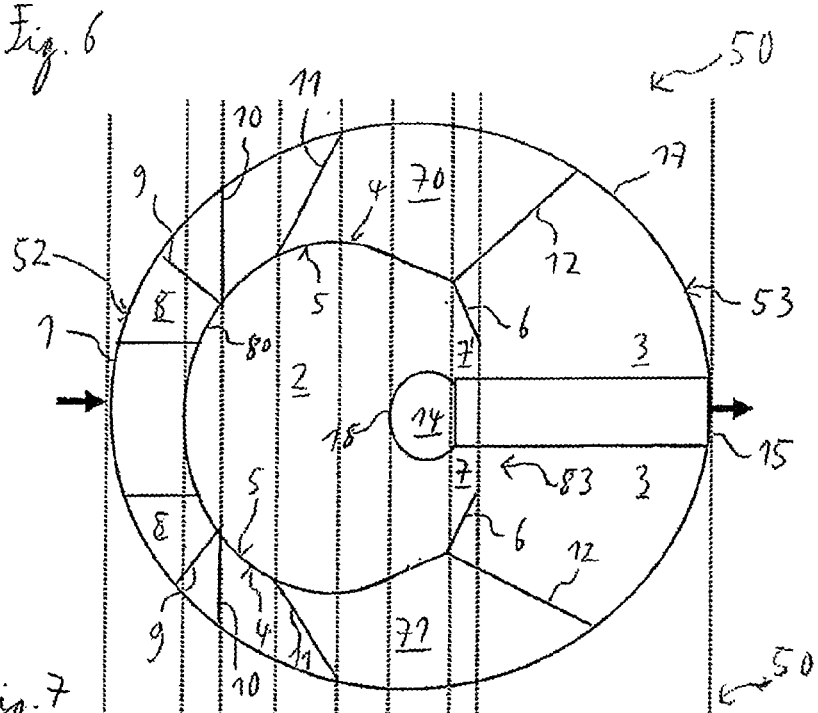
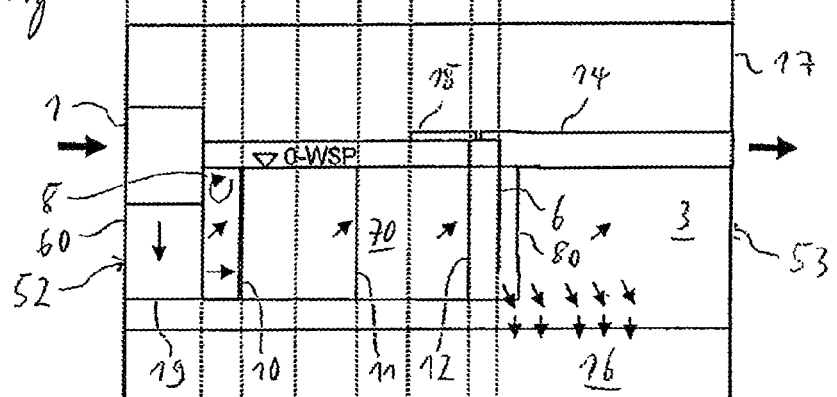
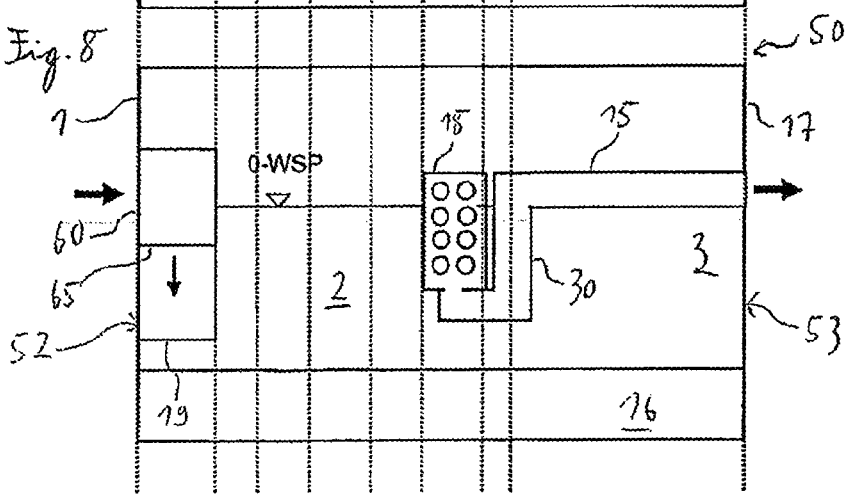

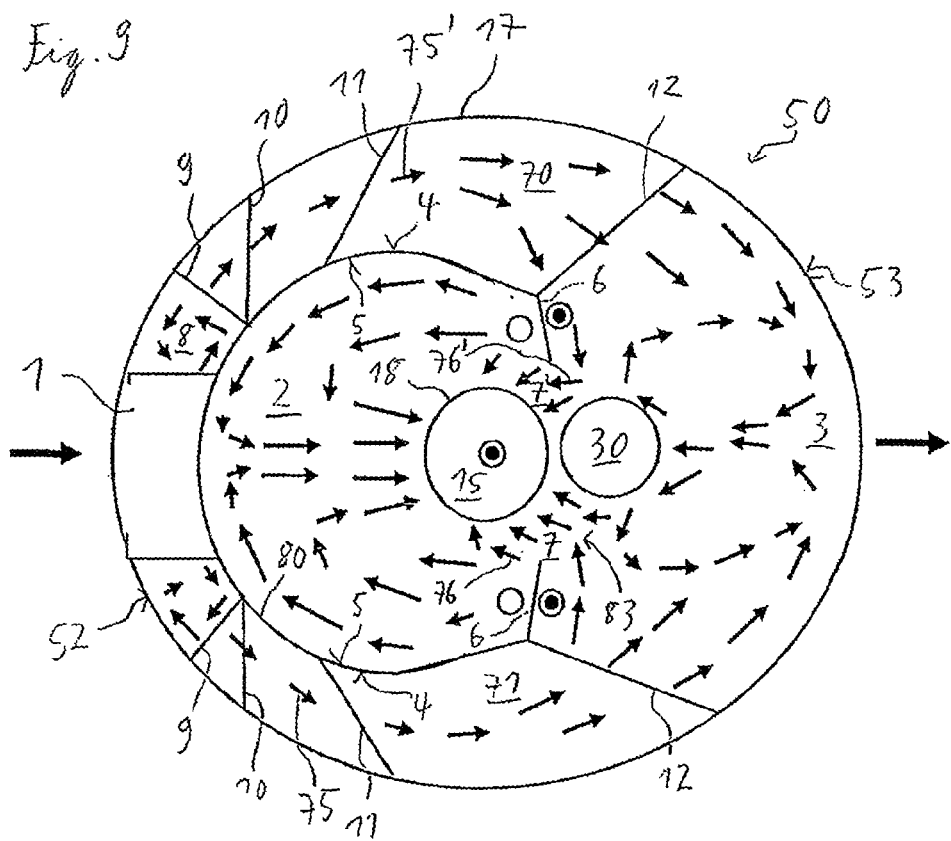

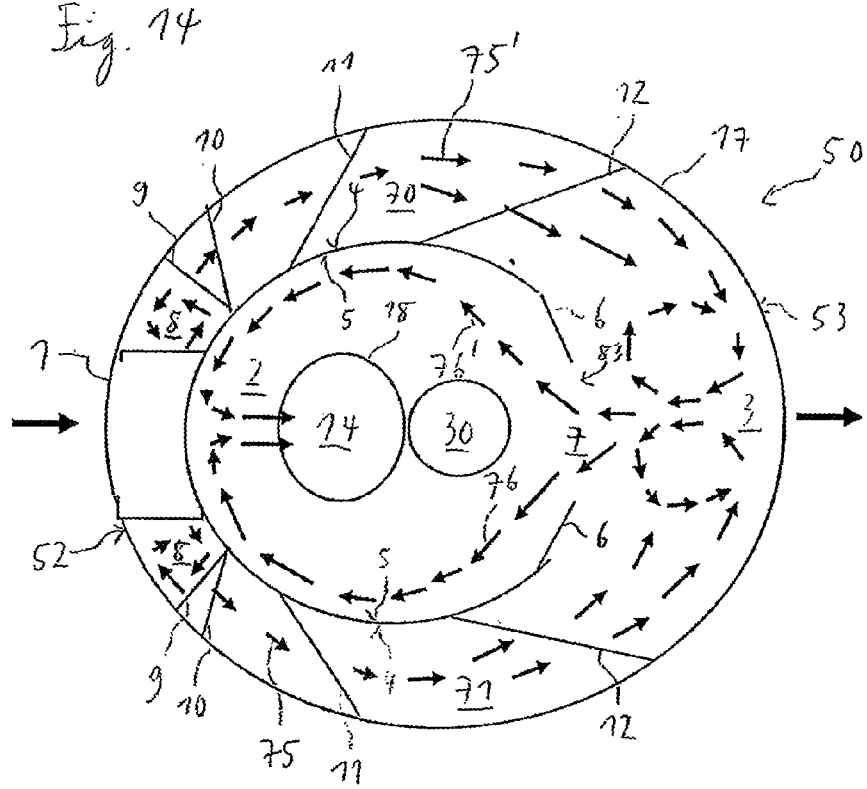
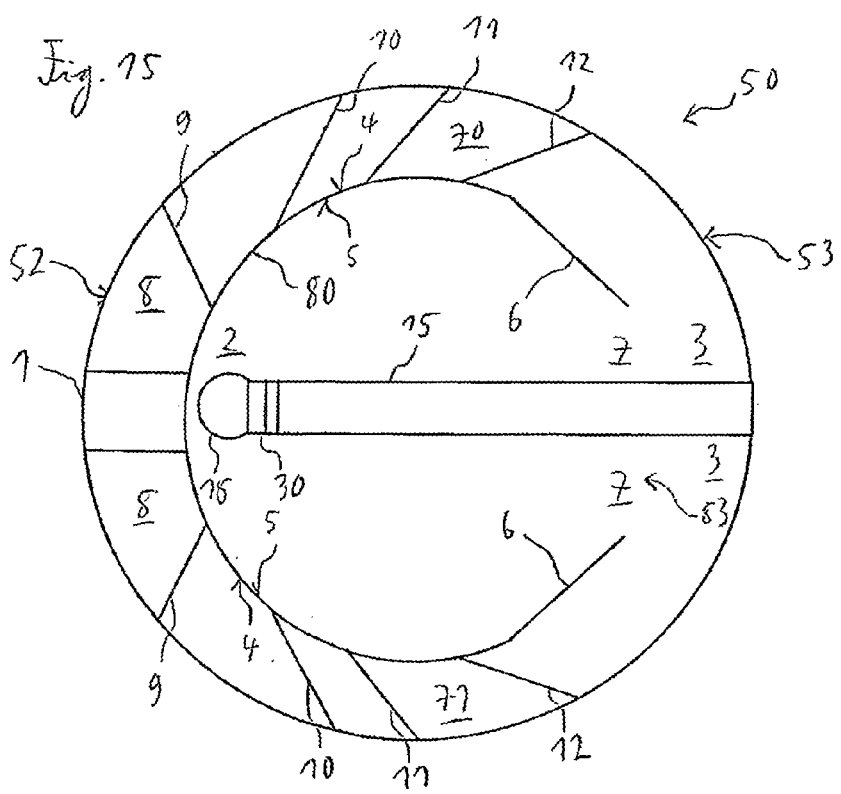

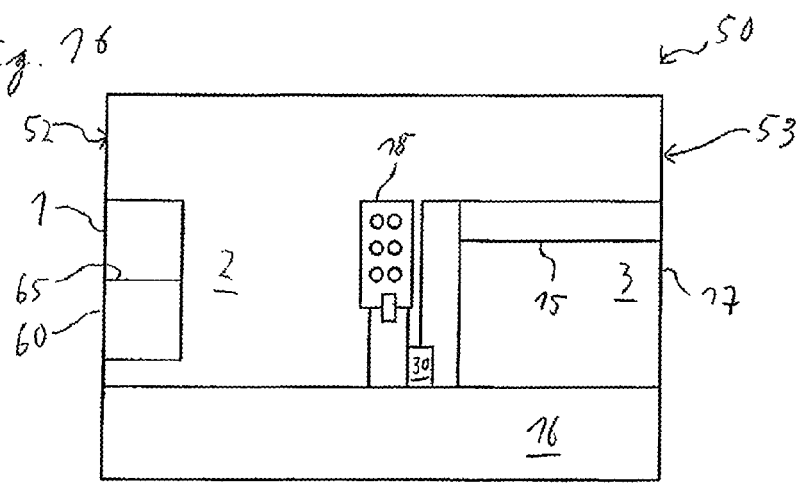
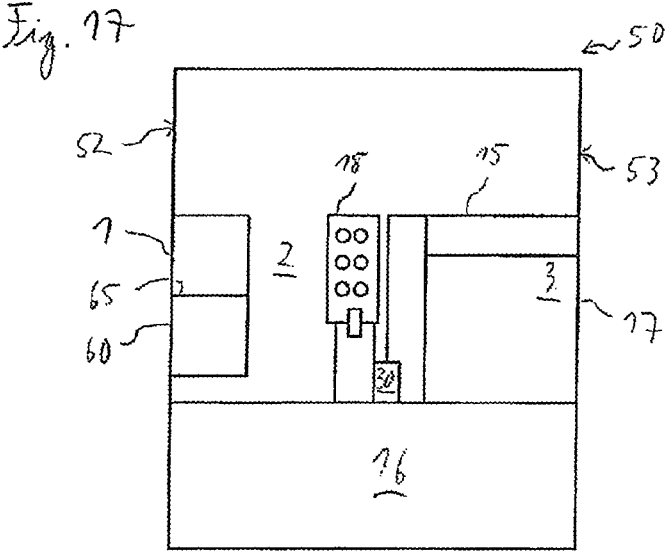
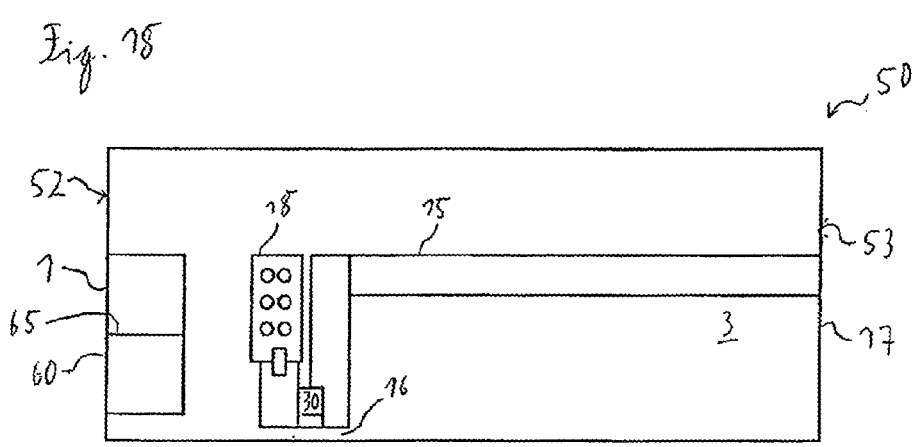

SEPARATOR FOR SEPARATING A LIGHT LIQUID-WATER MIXTURE AND METHOD FOR SEPARATING A LIGHT LIQUID-WATER MIXTURE

CROSS-REFERENCE TO RELATED APPLICATION

This Application is a Section 371 National Stage Application of International Application No. PCT/EP2011/065448, filed 7 Sep. 2011 and published as WO 2012/032079 A1 on Mar. 15, 2012, in German, the contents of which are hereby incorporated by reference in their entirety.

The invention relates to a separator for separating a light liquid-water mixture according to claim 1 and a method for separating a light liquid-water mixture according to claim 14.

Light-liquid separators are used everywhere where light liquids, generally oil and petrol, must not be discharged into the public sewage system or a water course and hence have to be retained.

The mode of operation of previous coalescence separators is based on a system in which small droplets of the light liquid, which would be entrained in the waste-water flow, adhere to a fine-mesh grid or foam functioning as a coalescence material and combine to form large droplets. These larger oil droplets rise with sufficient buoyancy (size). The coalescence material used, which, for example, occurs in the form of fine-cell, expanded mats or fine wire mesh, offers a large surface and in addition, the oleophilic behaviour of the surface of the coalescence material encourages the adhesion of the smallest of oil droplets. Hence, this provides a surface for coalescence.

One drawback of these conventional coalescence separators with fine-pore filters consists in the fact that, in addition to the light liquids in the waste water, they also filter suspended matter and fine sludge components. Since these substances also attach themselves to the light-liquid droplets which are separated in the coalescence element, these are deposited on the surface of the coalescence element. To prevent the congestion of the coalescence element and hence a malfunction of the separator, the coalescence elements require time-consuming cleaning at regular intervals. This results in high maintenance costs for a separator of this kind.

The invention is based on the object of disclosing a separator which separates a light liquid-water mixture in a technically simple way.

The object is achieved by a separator according to claim 1 and a method according to claim 14.

In particular, the object is achieved by a separator, which is arranged in a container having a circular or ellipsoidal cross section and having a container wall, for separating a light liquid-water mixture, for example oil-polluted water, comprising: a feed arranged on a first side of the container having a feed chicane, which directs the supplied mixture downwards and divides it into two first flow parts that are substantially of equal size, an outlet having an outlet tube, a circular or ellipsoidal flow wall having an internal wall side and an external wall side, wherein the flow wall passes through at least half of a full circle, preferably at least three quarters of a full circle and has an opening which is facing a second side of the container opposite the feed, wherein the flow wall between the external wall side of the flow wall and the container wall forms two flow channels at two opposite sides of the container wall in each case from the feed to the second side of the container, wherein in the flow channels in each case one of the two first flow parts is conducted from the feed to the second side of the container along the container wall, wherein the two first flow parts at the second side of the container having substantially opposite directions of flow meet one another and are reunited and hole elements arranged in the two flow channels elements, through which the two first flow parts flow.

An essential point of the invention consists in the guidance of the flow of the mixture in the separator. The mixture is divided into flow parts which, having substantially opposite directions of flow, meet one another. This process can also be repeated. One advantage of the separator according to the invention is that the hydraulic retention time of the mixture in the separator can be reduced. A further advantage is that the disclosed separator without fine-pore filters and without a further polishing stage complies with the discharge values for a coalescence separator specified in EN according to standard test methods. In particular, no filter materials, such as, for example, polyurethane foam, wire fabric or the like are required. This reduces the amount of cleaning for the separator and the congestion of the separator and hence a malfunction of the separator is to a large extent avoided. This reduces maintenance costs of the separator. In addition, the guidance of the mixture in the separator makes optimum utilisation of the volume of the separator. This enables the volume of the separator to be reduced. The meeting of two first flow parts at the second side of the separator results in a rotating flow, which reduces the resultant flow rate in the direction of the outlet. The reduction of the flow rate facilitates the better precipitation of fine sediments and ascent of fine oil droplets.

In a first embodiment, the outlet is arranged at substantially same height as the feed. The advantage of this is that the mixture or the water substantially undergoes no loss of height when passing through the separator. This enables the separator to be incorporated in an existing network in a technically simple way.

At least the first in each case of the hole elements in the direction of flow of the respective first flow part in the respective flow channel can be arranged such that a part of the first hole element is disposed above a lower edge of the feed to form a rotating flow of the respective first flow part between the part of the first hole element disposed above the lower edge of the feed and the feed. This causes a rotating flow to form above the lower edge of the feed in the space between the feed and the first hole element. This rotating flow causes large quantities of light liquid to be separated at this point and these accumulate in this region.

In a further embodiment, flow elements are arranged at the outlet, in particular at the outlet tube of the outlet, to re-divide the reunited first flow parts into two second flow parts that are substantially of equal size and to direct each of the two second flow parts through a tapering region and from the second side along the internal wall side of the flow wall in the direction of the first side of the container, wherein the two second flow parts having substantially opposite directions of flow at the internal wall side of the flow wall meet one another and are reunited at the first side of the container. The flow along the internal wall side of the flow wall and the rotation of the flow or flow parts and the resultant significant extension of the flow path achieves a further separation of the light liquid from the water. The tapering regions cause an increase in the flow rate of the flow parts at these points. This increase in the flow rate ensures that fine sediments and oil droplets are carried away from the outlet so that congestion or closure of the outlet is to a large extent avoided. In addition, the meeting of the second flow parts reduces the flow rate again, which intensifies the deposition of sediments and the ascent of oil.

In a further embodiment, flow elements are arranged at the opening of flow wall as an extension of the flow wall flow elements to create a rotating flow of the two first flow parts and/or the two reunited first flow parts at the second side of the container, to re-divide the reunited first flow parts into two second flow parts that are substantially of equal size and to direct each of the two second flow parts through a tapering region and from the second side along the internal wall side of the flow wall in the direction of the first side of the container, wherein the two second flow parts having substantially opposite directions of flow at the internal wall side of the flow wall meet one another and are reunited at the first side of the container. The flow elements as an extension of the flow wall favour or encourage the formation of rotating flows in the rear separator area. The intensification of the rotating flows further extends the flow path of the mixture, which increases the separation of the light liquid from the water. Similarly, the intensification of the rotating flows further reduces the flow rate in the direction of the outlet, which intensifies the precipitation of fine sediments and the ascent of fine oil droplets. The flow along the internal wall side of the flow wall and the rotation of the flow or flow parts and the significant extension of the flow path achieves a further fine separation of the light liquid from the water. The tapering regions cause an increase in the flow rate of the flow parts. This increase in the flow rate ensures that fine sediments and oil droplets are carried away from the outlet so that congestion of the outlet is to a large extent avoided. In addition, the meeting of the second flow parts reduces the flow rate again thus intensifying the deposition of sediments and the ascent of oil.

In a further embodiment, flow elements are arranged at the opening of flow wall to re-divide the reunited first flow parts into two second flow parts that are substantially of equal size, to direct a part of the two second flow parts in each case through a tapering region and from the second side along the internal wall side of the flow wall in the direction of the first side of the container and to direct a part of the respective second flow parts below the flow elements, wherein at least parts of the two second flow parts having substantially opposite directions of flow at the internal wall side of the flow wall meet one another and are reunited at the first side of the container. The flow along the internal wall side of the flow wall and the rotation of the flow or flow parts and the significant extension of the flow path achieve a further fine separation of the light liquid from the water. The tapering regions achieve an increase in the flow rate of the flow parts. This increase in the flow rate ensures that fine sediments and oil droplets are carried away from the outlet so that congestion of the outlet is to a large extent avoided. In addition, the fact that a part is guided along below the flow elements causes the flow path of the mixture to be further extended. This achieves improved separation of the light liquid from the water. In addition, the meeting of at least parts of the second flow parts causes the flow rate of said parts to be reduced again thus intensifying the deposition of sediments and the ascent of oil.

The outlet can substantially be arranged in the middle of the container. One advantage of this is that the mixture a travels an equally long flow path regardless of how the second flow parts are guided.

The separator can substantially be embodied with mirror symmetry with respect to a plane through the feed into the outlet. This ensures that the flow paths for the two first flow parts are of equal length in each case and the flow paths for the two second flow parts are of equal length in each case. This ensures uniform separation of light liquid from the water in the different flow parts.

In a further embodiment, a, in particular round, rectangular or ellipsoidal, coarse dirt trap is arranged around the outlet. The coarse dirt trap prevents the discharge of fibrous material, branches etc. from the separator. This prevents congestion of the outlet or of the outlet tube by coarse dirt to a large extent.

In a further embodiment, at least the surface of the hole elements and/or the flow elements and/or the internal and/or the external wall side of the flow wall is made of an oleophilic material, in particular HDPE. One advantage of this is that the adhesion of the light liquid to the respective surfaces is increased and hence the formation of larger light-liquid droplets is encouraged. Larger light-liquid droplets rise more quickly than clear light-liquid droplets to the surface of the mixture or the water. Hence, this increases the separating capacity of the separator.

At least a part of the respective flow channel can be delimited in the direction of a base of the container by a delimiting element. This forced guidance of the light liquid-water mixture in the respective flow channel significantly increases the separating capacity of the separator. The smaller cross section in the part of the respective flow channel causes an increase in the flow rate of the mixture and the deposition of solids in this part of the respective flow channel is to a large extent avoided.

A sludge collection chamber can be arranged on a base of the container to gather and collect coarse sludge and/or heavy sediments. This ensures that solids in the separator can also be separated from a light liquid-water-solid mixture and collected in the separator. This means that further separation of a mixture of this kind, for example in a separate container, is not necessary. The sludge collection chamber on the base of the container also ensures that the flow behaviour of the mixture in the remaining part of the container is, to a large extent, not influenced by the accumulation of solids on the base of the container.

In a further embodiment, at least one of the hole elements and/or the flow elements only extends over a part of a height of the container. This improves the flow behaviour of the mixture in the container. It also enables the better sedimentation of solids in the mixture.

The invention is also achieved by a method for separating a light liquid-water mixture, for example oil-polluted water, in a separator having an internal chamber and an external chamber comprising the following steps: feeding the mixture through a feed arranged on a first side of the separator, dividing the mixture in two first flow parts of approximately equal size, causing the two first flow parts to flow through a plurality of hole elements in two flow channels arranged in the external chamber, reuniting the two first flow parts on a second side of the separator opposite the first side through the meeting of the two first flow parts having substantially opposite directions of flow, re-dividing the mixture of the two reunited first flow parts into two second flow parts that are substantially of equal size and directing the two second flow parts in the internal chamber in the direction of the feed, reuniting at least parts of the two second flow parts in the internal chamber at the first side of the separator through the meeting of at least parts of the two second flow parts having substantially opposite directions of flow and discharging the water from the internal chamber through an outlet.

One advantage of this is that the hydraulic retention time of the mixture in the separator can be reduced. It is also advantageous that there is a reduced amount of cleaning for the separator and congestion of the separator and hence malfunctions of the separator are to a large extent avoided. Hence, the maintenance costs are reduced. A further advantage is that the disclosed separator without fine-pore filters and without a further polishing stage complies with the discharge values for a coalescence separator specified in EN 858 according to standard test methods. In addition, optimum utilisation of the volume of the separator is achieved. Hence, the volume of the separator can be reduced. The meeting of the two first flow parts at the second side of the separator causes a rotating flow to form, which reduces the resultant flow rate in the direction of outlet for a short time. The reduction of the flow rate enables fine sediments to precipitate and fine oil droplets to rise. The flow along the internal wall and the rotation of the flow or flow parts and the significant extension of the flow path achieves a further fine separation of the light liquid from the water. The tapering regions case the flow rate of the flow parts to rise. This increase in the flow rate ensures that fine sediments and oil droplets are carried away from the outlet so that congestion or closure of the outlet is avoided to a large extent avoided. In addition, the meeting of the second flow parts reduces the flow rate again, which intensifies the deposition of sediments and the ascent of oil.

Figure 12:
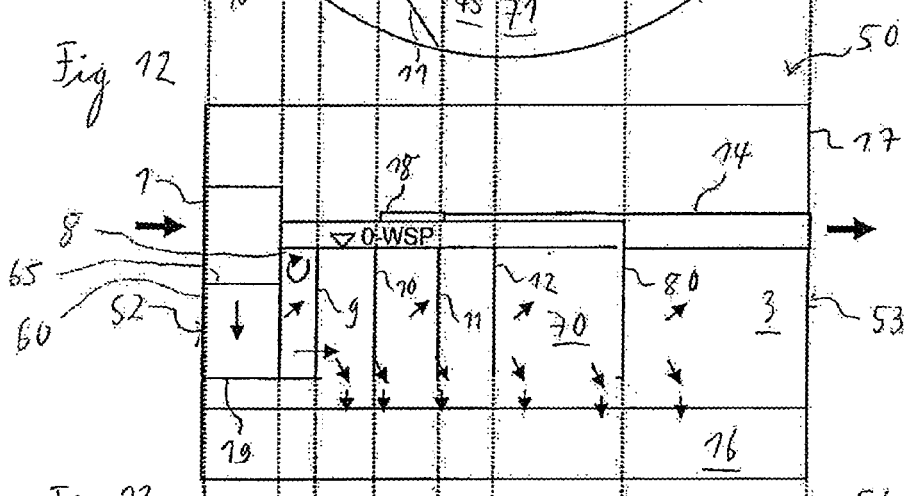
Figure 13:
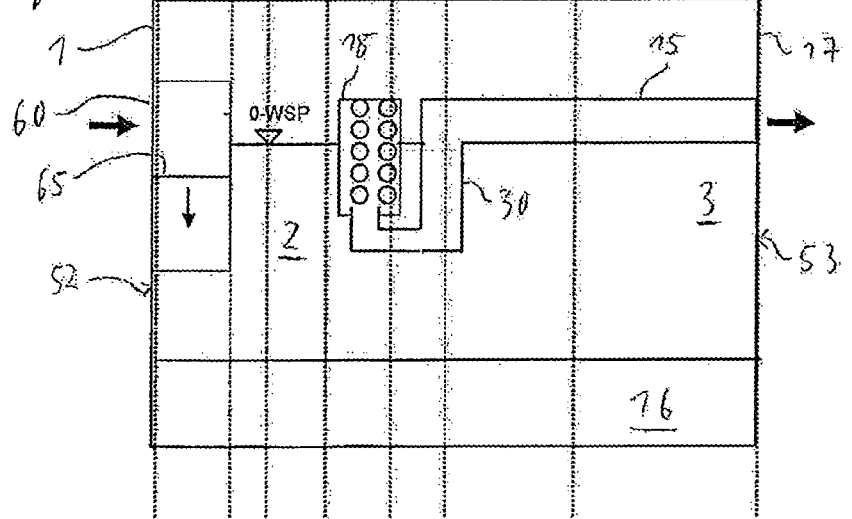

Preferred embodiments may be derived from the subclaims. The invention will now be described in more detail with reference to drawings of exemplary embodiments, which show FIG. 1 a view of an embodiment of a separator according to the invention;

FIG. 2 a side view of the embodiment of a separator according to the invention from FIG. 1;

FIG. 3 a further side view of the embodiment of a separator according to the invention from FIG. 1 and FIG. 2;

FIG. 4 a view with the flow behaviour of the mixture in the embodiment of a separator according to the invention from FIGS. 1-3;

FIG. 5 a view of a further embodiment of a separator according to the invention;

FIG. 6 a view of a further embodiment of a separator according to the invention;

FIG. 7 a side view of the further embodiment of a separator according to the invention from FIG. 6;

FIG. 8 a further side view of the further embodiment of a separator according to the invention from FIG. 6 and FIG. 7;

FIG. 9 a view with the flow behaviour of the mixture in the further embodiment of a separator according to the invention from FIG. 6-8;

FIG. 10 a view of a further embodiment of a separator according to the invention;

FIG. 11 a view of a further embodiment of a separator according to the invention;

FIG. 12 a side view of the further embodiment of a separator according to the invention from FIG. 11;

FIG. 13 a further side view of the further embodiment of a separator according to the invention from FIG. 11 and FIG. 12;

FIG. 14 a view with the flow behaviour of the mixture in the further embodiment of a separator according to the invention from FIGS. 11-13;

FIG. 15 a further view of a further embodiment of a separator according to the invention; and FIG. 16-18 side views of further embodiments of a separator according to the invention.

In the following description, the same reference numbers are used for the same parts and parts with the same functions.

FIG. 1 shows a view of a first embodiment of a separator according to the invention 50. The separator 50 has an ellipsoidal cross section. The separator 50 comprises a feed 1 through which a light liquid-water mixture or a light liquid-water-sludge mixture or a light liquid-water-solid mixture is fed to the container of the separator 50. The light liquid can for example oil and/or petrol.

The supplied mixture is pressed by downwards, i.e. in the direction of the base of the container of the separator 50 means of a inlet chicane 60 directly at feed 1 at the first side 52 of the separator 52. Here, due to the shape of the feed chicane 60, the supplied mixture is forced to divide into two flow parts 75, 75'. The two openings of the feed chicane 60 have a size of approximately 220 mm from the lower edge of the feed chicane.

A flow wall 80, with a cross section which is substantially the same shape as the container or the container wall 17 of the separator 50 is arranged in the separator 50. The flow wall 80 comprises an internal wall side 5, and an external wall side 4. The flow wall 80 passes through approximately ¾ of a full circle, i.e. approximately 270°, and has hence an opening 83. When the flow wall 80 has passed approximately 270°, the opening hence has an angle of approximately 90°. The opening 83 faces a second side 53 of the separator 50 opposite the feed 1.

A flow channel 70, 71 is formed in each case between the flow wall 80 and the container wall 17 at two opposite sides of the container. When the mixture has been divided into two first flow parts 75, 75' by the inlet chicane 60, the two first flow parts 75, 75' are guided in each case through the first flow channel 70 or the second flow channel 71 from the feed 1 to the second side 53 of the container along the container wall 17. In the upper half of FIG. 1, the direction of flow of the first flow part 75 runs in the first flow channel 70 substantially in the clockwise direction. In the lower half of FIG. 1, the direction of flow of the first flow part 75' in the second flow channel 71 runs substantially in the anticlockwise direction.

Arranged in the flow channels 70, 71 in each case are a plurality of hole elements 9-12, for example perforated sheets. In each case, the hole elements 9-12 have a hole diameter of approximately 40 mm. Larger and smaller hole diameters are conceivable. It is also conceivable for the different hole elements 9-12 to have different hole diameters. The hole elements 9-12 have in each case a very high number of holes. In each case, the holes have a distance of approximately 15 mm to each other in the horizontal and vertical directions.

In the respective flow channel 70, 71, the two first flow parts 75, 75' flow through at least the first two hole elements 9, 10 completely. At least parts of the first flow parts 75, 75' flow through the remaining hole elements 11, 12. The hole elements 9-12 are in each case fastened to the external wall side 5 of the flow wall 80 and to the container wall 17. It is also conceivable for the hole elements 9-12 to be fastened to the upper side of the separator 50 or to a guiding aid extending directly above the hole elements 9-12.

The two first hole elements 9, 10 are in contact at the external wall side 4 of the flow wall 80 and, in the view according to FIG. 1, form an angle of approximately 65° degrees to each other. The third hole element 11 in the respective flow channel 70, 71 is located at a distance to the first two hole elements 9, 10. The angle of the third hole element 11 with reference to the direction of flow of the mixture in the respective flow channel 70, 71 is greater than the corresponding angle of the first two hole elements 9, 10.

The fourth hole element 12 is arranged at a larger distance to the third hole element 11 than the distance from the third hole element 11 to the second hole element 10. The angle of the fourth hole element 12 with respect to the direction of flow of the first flow parts 75, 75' is in each case greater than the corresponding angle of the third hole element 11 and the first and second hole elements 9, 10. From the feed 1 along the direction of flow of the mixture, the hole elements 9-12 have a increasing length in each case.

Arranged on the second side 53 of the container is a rear separator area 3 in which the two first flow parts 75, 75' having substantially opposite directions of flow meet one another and are hence reunited. The two first flow parts 75, 75' or the reunited first flow parts 75, 75' form one or more rotating flows in this rear separator area 3.

This rear separator area 3 is located substantially between the opening 83 of the flow wall 80 and the second side 53 of the separator 50. From this rear separator area 3, the reunited first flow parts 75, 75' flow into the internal chamber 2 of the container, which is located between the internal wall sides 5 of the flow wall 80. The external chamber 45 of the container is located between the external wall sides 4 and the container wall 17.

The separator comprises in addition, an outlet 14 having an outlet pipe 15. The outlet 14 is located substantially in the middle of the container or between the middle of the container and the second side 53 of the separator 50. A flow element 6 is arranged at the outlet 14 on two opposite sides of the outlet 14 in each case. The flow elements 6 form an angle of approximately 130 degrees to each other. The two flow elements 6 cause a tapering region 7, 7' to form in each case between the flow elements 6 and the flow wall 80 at the opening 83 of the flow wall 80.

The flow elements 6 cause the reunited first flow parts 75, 75' to be divided again into two second flow parts 76, 76' of approximately equal size. The mixture flows in form of two second flow parts 76, 76' through the tapering regions 7, 7' and to a large degree past the outlet 14. The two second flow parts 76, 76' are mainly guided through the flow elements 6 along the internal wall side 5 of the flow wall 80 in the direction of the first side 52 of the container or in the direction of the feed 1.

At the internal wall side 5 of the flow wall 80 at the first side 52 of the container, the second flow parts 76, 76' having substantially opposite directions of flow meet one other and are reunited. Here, again, rotating flows can form. From here, the mixture flows in the direction of the second side 53 of the separator 50 in the direction of the outlet 14. A round coarse dirt trap 18 is arranged around the outlet 14. The coarse dirt trap can also have a rectangular or ellipsoid shape. Further shapes are conceivable.

The separator 50 is embodied substantially with mirror symmetry with respect to a plane running through the feed 1 and the outlet 14.

FIG. 2 shows a side view of the embodiment of a separator according to the invention 50 from FIG. 1. The dotted lines between the individual figures indicate the spatial relationships between the components in the individual views. The mixture flows through the feed 1 into an inlet chicane 60 located below the lower edge 65 of the feed 1 into the container. In the region from the first side of the container 52 or the feed 1 to the second hole element 10, the flow channel 70, 71 is closed at the bottom by a delimiting element 19, for example a base plate. This region which is closed at the bottom corresponds in each case to approximately a third of the respective flow channel 70, 71.

An upper part of at least the first two hole elements 9, 10 is located above the lower edge 65 of the feed 1. As a result, a rotating flow is formed in the region above the lower edge 65 of the feed 1 between the feed 1 and the first hole element 9 or the first hole elements 9, 10. In this region 8, the rotating flow causes larger oil drops to accumulate and remain in this region 8. To a large extent, solids are not precipitated in this region 8.

In each case, after the second hole element 10, the flow channels 70, 71 are open at the bottom so that the mixture is also able to flow through the region located below the remaining hole elements 11, 12. This results in an increase in the flow cross section of the mixture, which reduces the flow rate. As a result, sedimentable solids are easily precipitated in this region which is open at the bottom.

The hole elements 9-12 only extend over a part of the height of the separator 50. Hence the mixture can also flow along below the third and fourth hole elements 11, 12 along.

A sludge collection chamber 16 is arranged below the hole elements 9-12. The sludge collection chamber 16 extends over the complete width of the separator 50. It is also conceivable for the sludge collection chamber 16 to extend over only a part of the width of the separator 50. Solids can be deposited and accumulate in the sludge collection chamber 16. The flow behaviour the light liquid or the solids is indicated in FIG. 2 by arrows pointing (obliquely) upward or (obliquely) downward. Due to the oleophilic material, preferably HDPE, used for the hole elements 9-12, fine oil droplets combine to form larger drops and float on the water or on the mixture. HDPE designates a polyethylene with weakly branched polymer chains, and hence high density. Other types of oleophilic or lipophilic materials are conceivable. It is also conceivable for the actual hole elements 9-12 to be made of a non-oleophilic material and only to have a finish or coating made of oleophilic material.

FIG. 3 shows a further side view of the embodiment of a separator according to the invention 50 from FIG. 1 and FIG. 2. The side view of FIG. 3 shows mainly the internal chamber 2 of the separator 50. This clearly identifies the substantially cylindrical dirt trap 18, which is arranged around the substantially cylindrical outlet 14. "0-WSP" indicates the height at which the mixture is fed-in (so-called zero water level). The outlet 14 or the outlet tube 15 of the outlet 14 is located at substantially the same height as the feed 1. FIG. 3 does not show the flow wall 80 and the flow elements 6.

The outlet 14 comprises a connector 30 extending below the coarse dirt trap 18 which is embodied as siphon-shaped or U-shaped. The outlet 14 is located to a large degree below the process water level of the mixture. Since the separator has, to a large extent, separated light liquid, in particular oil, from the water, to a large degree the light liquid floats on the water. Hence, the outlet 14 or the U-shaped connector 30, which extends in a siphon-shaped from the lower end of the outlet 14 or the dirt trap 18, substantially only removes water. The light liquid remains in the separator 50.

From the connector 30, the discharged water goes to in the outlet pipe 15 and is guided by out of the separator 50, for example into the sewage system. A float (not shown) can be arranged in the outlet 14, with a specific density such that it floats in or on water but not in or on oil. Hence, the float in the outlet 14 sinks when there is too much oil at the outlet 14 or on the water. The sinking causes the float to seal the outlet 14.

FIG. 4 is a view showing the flow behaviour of the mixture in the embodiment of a separator according to the invention 50 from FIGS. 1-3. The flow behaviour of the mixture for a circular container is indicated by arrows. The flow behaviour approximately 15 cm below the process water level is shown in FIG. 4 without depicting the outlet tube 15.

The mixture passes through the feed 1 at the first side 52 of the separator 50 into the container. After the division of the mixture into two first flow parts 75, 75' substantially of equal size, the water is guided through two flow channels 70, 71. In the region between the feed 1 and the first hole element 9, a rotating flow is formed in the upper region above the lower edge 65 of the feed 1 causing larger oil drops to be separated from the water as early this point.

The two first flow parts 75, 75' are directed from the flow wall 80 and the container wall 17 into the rear separator area 3. In this region 3, the two first flow parts 75, 75' having substantially opposite directions of flow meet one another and are reunited. During this, one or more rotating flows can form. From this rear separator area 3, the mixture goes in the internal separator chamber 2. The flow elements 6 cause the mixture, which comprises the reunited first flow parts 75, 75', to be re-divided into two second flow parts 76, 76' of approximately equal size. Each of these two second flow parts 76, 76' pass through a tapering region 7, 7' and, at the internal wall side 5 of the flow wall 80, are guided along in the direction of the feed 1. At the internal wall side 5 of the flow wall 80 at the first side 52 of the separator 50, the two second flow parts 76, 76' having substantially opposite directions of flow meet one another and are reunited. From here, the mixture flows back away from the feed 1 in the direction of the second side 53 of the separator 50 and the water flows through the coarse dirt trap 18 into the outlet 14.

FIG. 5 is a view of a further embodiment of a separator according to the invention 50. The separator 50 FIG. 5 is embodied very similarly to the separator 50 in FIGS. 1-4.

However, the separator 50 in the embodiment shown in FIG. 5 is has a circular cross section. The outlet 14 is positioned further from the middle of the separator 50 than in the case of the embodiment the in FIGS. 1-4 and displaced toward the second side 53.

The feed 1 has a width of approximately 210 mm. The first two hole elements 9, 10 are each arranged at a distance of approximately 445 mm from the feed 1. The distance of the hole elements 9-12 relates in each case to the distance between the middle of the feed 1 at the container wall 17 and the point on the external wall side 4 of the flow wall 80, at which the respective hole element 9-12 is contact with the flow wall 80. The third hole element 11 is arranged at a distance of approximately 690 mm. The fourth hole element 12 is arranged at a distance of approximately 850 mm.

The distances of the hole elements 9-12 from the middle of the feed 1 to the point on the container wall 17, at which the respective hole element 9-12 is in contact with the container wall 17 are respectively approximately 445 mm, approximately 770 mm, approximately 1060 mm and approximately 1275 mm. The hole elements 9-12 have a height of approximately 600 and width of up to approximately 200 mm. The holes each have a distance in the horizontal and direction of approximately 15 mm to each other.

The outlet 14 has a distance of approximately 855 mm to the feed 1. The length of the flow elements 6 is approximately 200 mm. The cross section of the opening 83 of the flow wall 80 has a width of approximately 450 mm. The flow channels 71, 71' each have a width of approximately 250 mm.

The distance between the upper edge of the feed 1 and the upper end of the sludge collection chamber 16 is approximately 800 mm. The distance between the upper end of the sludge collection chamber 16 and the lower end of the outlet 14 or the lower end of the coarse dirt trap 18 is approximately 225 mm. The diameter of the coarse dirt trap 18 or of the outlet 14 is approximately 300 mm.

The distance between the coarse dirt trap 18 and the container wall 17 on the second side 53 of the separator 50 is approximately 450 mm. The coarse dirt trap 18 has holes with an intermediate distance in the horizontal and vertical direction of approximately 15 mm. The feed 1 and the main dirt trap 18 have a distance of at least 660 mm to the cover of the separator 50. Other sizes or distances are conceivable.

The separator is a coalescence separator according to the European standard EN 858 with hydrocarbon contents of less than 5 mg/l in the outlet according to the test setup specified in DIN EN 858.

FIG. 6 shows a view of a further embodiment of a separator according to the invention 50. The embodiment shown in FIG. 6 differs from the embodiment shown in FIGS. 1-4 mainly in the arrangement of the flow elements 6 and the arrangement of the second hole elements 10.

The flow elements 6 are arranged at the ends of the flow wall 80, i.e. at the opening 83 of the flow wall 80. In each case, they form an angle of approximately 90 degrees to the fourth hole element 12. The flow elements 6 guide a partial flow of the mixture from the rear separator area 3 into the outlet 14. The tapering regions 7, 7', which are formed by the flow elements 6 and the vertical connector 30 from the outlet 14 to the outlet pipe 15 and which greatly reduce the direct inflow auf the outlet, result in a flow runs downward, below the flow elements 6. The downward or upward flow is depicted by circles with an internal point or without such a point, i.e. with an empty circle, in FIG. 9. The part of the mixture, which is guided below the flow elements 6, flows to the side of the flow elements 6 facing the internal chamber 2 into the internal chamber 2 and is divided therein. In each case, a partial flow of the mixture flows along the internal wall 5 of the flow wall 80 and a partial flow of the mixture flows directly into the outlet 14. The result of this type of flow guidance in the rear separator area 3 and in the internal chamber 2 of the separator is that, on the one hand, the entire mixture or a significant partial flow thereof has to cover a very long flow path.

The flow wall 80 passes through slightly more than approximately half of a full circle, i.e. approximately 190°, and has hence an opening 83. When the flow wall 80 has passed through approximately 190°, the opening hence has an angle of approximately 80°. The opening 83 faces a second side 53 of the separator 50 opposite the feed 1.

The second hole element 10 forms an angle of approximately 65° relative to the first hole element 9. Larger or smaller angles are conceivable. The two hole elements 9, 10 form a flow resistance for the two first flow parts 75, 75'.

FIG. 7 shows a side view of the further embodiment of a separator according to the invention 50 from FIG. 6. Unlike the embodiment shown in FIG. 2, in the embodiment shown in FIG. 7, the respective flow channel 70, 71 from the feed 1 up to the fourth hole element 12 is shut off or delimited at the bottom by a delimiting element 19. Hence, after the end of the guidance, the coarse sludge, which is partially also deposited in these guide channels 70, 71, falls directly into the sludge collection chamber 16 located below. A further part of the fine sludge settles in the rear separator area 3 and also falls into the sludge collection chamber 16. A part of the fine sludge also settles in the internal separator area, in particular at the place at which the two second flow parts 76, 76' meet one another and are reunited. This reduces the flow rate and solids settle more readily.

FIG. 8 shows a further side view of the further embodiment of a separator according to the invention 50 from FIG. 6 and FIG. 7.

FIG. 9 shows a view with the flow behaviour of the mixture in the further embodiment 50 of a separator according to the invention in FIG. 6-8. The flow behaviour of the mixture from the feed 1 to the opening 83 of the flow wall 80 substantially corresponds to that of the embodiment shown in FIG. 4. In the rear separator area 3, the two first flow parts 75, 75' meet one another.

The mixture flows through the tapering regions 7, 7', which are formed between the connector 30 of the outlet 14 and the two flow elements 6, into the internal chamber 2 of the separator 50. This tapering of the flow cross section directs a part of the second flow parts 76, 76' downward and causes it flow underneath the flow elements 6 along. On the side of the flow elements 6 facing the internal chamber 2, this part flows back upward. A part of this flow part and of the mixture, which has flown through the tapering regions 7, 7', flows directly to the outlet 14. Another part of the flow parts flows along the internal wall 5 of the flow wall 80 in the direction of the feed 1 or the first side 52 of the separator 50. At the internal wall 5 of the flow wall 80 at the first side 52 of the separator 50, these parts of the second flow parts 76, 76' having substantially opposite directions of flow meet one another and are reunited. This part of the mixture, which has been reunited, goes from here to the outlet 14.

FIG. 10 shows a view of a further embodiment of a separator according to the invention 50. The embodiment of the separator according to the invention 50 shown in FIG. 10 differs from the embodiment shown in FIG. 6 in that the cross section of the container is circular and that the cross section of the flow wall 80 forms a part of a circle.

The first two hole elements 9, 10 are in each case arranged at a distance of approximately 290 mm from the feed 1. The distance of the hole elements 9-12 relates in each case to the distance between the middle of the feed 1 at the container wall 17 and the point on the external wall side 4 the flow wall 80, on which the respective hole element 9-12 is in contact with the flow wall 80. The third hole element 11 is arranged at a distance of approximately 490 mm. The fourth hole element 12 is arranged at a distance of approximately 650 mm.

The distances of the hole elements 9-12 from the middle of the feed 1 to the point on the container wall 17 at which the respective hole element 9-12 is in contact with the container wall 17 are respectively approximately 290 mm, approximately 470 mm, approximately 680 mm and approximately 860 mm. The hole elements 9-12 have a height of approximately 560 and a width of up to approximately 200 mm.

The outlet 14 has a distance of approximately 470 mm to the feed 1. The cross section of the opening 83 of the flow wall 80 has a width of approximately 615 mm. The flow channels 71, 71' have in each case a width of approximately 145 mm. The distance between the upper edge of the feed 1 and the upper end of the sludge collection chamber 16 is approximately 920 mm. The feed 1 and the main dirt trap 18 have a distance of at least 410 mm to the cover of the separator 50. Other sizes or distances are conceivable.

FIG. 11 shows a view of a further embodiment of a separator according to the invention 50. In this embodiment, the flow elements 6 are arranged as an extension of the flow wall 80 at the flow wall 80 or at the opening 83 of the flow wall 80. The outlet 14 is arranged between the middle of the container of the separator 50 and the feed 1.

The flow wall 80 passes through slightly more than half of a full circle, i.e. approximately 200°, and has hence an opening 83. When the flow wall 80 has passed through approximately 200°, the opening hence has an angle of approximately 160°. The opening 83 faces is a second side 53 of the separator 50 opposite the feed 1.

FIG. 12 shows a side view of the further embodiment of a separator according to the invention from FIG. 11. The delimiting element 19 ends just after the first hole element 9. However, it is also conceivable for the delimiting element 19 only to end after the second hole element 10 in the direction of flow.

FIG. 13 shows that, with this embodiment, the distance between the lower edge 65 of the feed 1 or the feed chicane 60 and the lower edge of the outlet 14 or of the connection piece 30 of the outlet 14 and the sludge collection chamber 16 is greater than it is in the embodiments shown previously. However, the feed 1 and the outlet 14 are located at substantially the same height.

FIG. 14 is a view showing the flow behaviour of the mixture in the further embodiment of a separator according to the invention from FIG. 11-13. The mixture flows in two first flow parts 75, 75', similarly to the case in the embodiments shown previously, from the feed 1 to the rear separator area 3. The arrangement of the flow elements 6 causes one or more rotating flows to form here. The second flow parts 76, 76', which are approximately of equal size and formed from the reunited mixture, flow through the tapering regions 7, 7' formed between the flow elements 6 into the internal chamber 2 of the separator 50. Here, they flow along the internal wall side 4 the flow wall 80 to the feed 1 or to the first side 52 of the separator 50. Here, the two second flow parts 76, 76' having substantially opposite directions of flow meet one another again and are reunited. From here, the mixture flows in the direction of the outlet 14.

FIG. 15 shows a further view of a further embodiment of a separator according to the invention 50. The cross section of the separator 50 has a circular shape. The flow wall 80 also has a circular shape. The outlet 14 or the coarse dirt trap 18, which is arranged around the outlet 14, is located closer to the feed 1 than to the middle of the separator 50.

The hole elements 9 to 12 are arranged at other positions than is the case with the embodiments shown previously. The first hole element 9 in the direction of flow of the respective first flow parts 75, 75' is located after approximately 1/10 of the full circle looking from the feed 1. The distance between the feed 1 and the first hole element 9 substantially corresponds to the distance between the second hole element 10 and the first hole element 9. The second hole element 10 has a larger angle to the direction of flow of the respective first flow part 75, 75'. A third hole element 11 is arranged at a further distance corresponding to the distance between the first 9 and second 10 hole element. This has in each case a similar angle to that of the second hole element 10 to the direction of flow of the first flow parts 75, 75'. The fourth hole element 12 is arranged at a similar distance to the third hole element 11 as the third hole element 11 is arranged to the second hole element 10 and has a larger angle to the direction of flow of the first flow parts 75, 75' than the first three hole elements 9 to 11 in each case.

The feed has a width of approximately 280 mm. The hole element 9 is arranged at a distance of approximately 600 mm from the feed 1. The distance of the hole elements 9-12 relates in each case to the distance between the middle of the feed 1 at the container wall 17 and the point on the external wall side 4 the flow wall 80 at which the respective hole element 9-12 is in contact with the flow wall 80. The second hole element 10 is arranged at a distance of approximately 805 mm. The third hole element 11 is arranged at a distance of approximately 1070 mm. The fourth hole element 12 is arranged at a distance of approximately 1340 mm.

The distances of the hole elements 9-12 from the middle of the feed 1 to the point on the container wall 17, at which the respective first, second and fourth hole element 9, 10, 12 is in contact with the container wall 17, are respectively approximately 760 mm, approximately 1345 mm and approximately 1910 mm. The hole elements 9-12 have a height of approximately 670 mm and a width of up to approximately 550 mm. The holes have in each case a distance in the horizontal and vertical direction of approximately 15 mm to each other.

The outlet 14 has a distance of approximately 630 mm to the feed 1. The cross section of the opening 83 of the flow wall 80 has a width of approximately 680 mm. The flow channels 71, 71' have in each case a width of approximately 380 mm. The coarse dirt trap 18 has a diameter of approximately 268 mm. Other sizes or distances are conceivable.

FIGS. 16-18 show side views of further embodiments of a separator according to the invention 18.

In FIG. 16, the separator 50 has a rectangular cross section. The outlet 14 is arranged between the middle of the separator 50 and the second side 53 of the separator. The siphon-shaped or U-shaped connector 30 of the outlet 14 runs partially at the upper edge of the sludge collection chamber 16, which is arranged in the lower fifth of the height of the separator 50. The length of the separator (internal dimension) in FIG. 16 is approximately 1500 mm.

In FIG. 17, the separator 50 has an approximately quadratic cross section. The outlet 14 is substantially arranged in the middle between the first side 52 and the second side 53 of the separator. The siphon-shaped or U-shaped connector 30 of the outlet 14 runs partially at the upper edge of the sludge collection chamber 16, which is arranged in the lower third of the height of the separator 50. The length of the separator (internal dimension) in FIG. 17 is approximately 1000 mm.

In FIG. 18, the separator 50 has a long-stretched, rectangular cross section. The outlet 14 is arranged close to the feed 1 arranged, i.e. the distance of the outlet 14 to the feed 1 is much smaller than the distance of the outlet 14 to the middle of the separator 50. The siphon-shaped or U-shaped connector 30 of the outlet 14 runs partially at the upper edge of the sludge collection chamber 16, which is very small is or as good as no longer in existence. The length of the separator (internal dimension) in FIG. 18 is approximately 2200 mm.

At this point it should be pointed out that all the parts described above, seen on their own and in any combination, in particular the details illustrated in the drawings, are claimed as being essential for the invention. Modifications of this are familiar to the person skilled in the art.

LIST OF REFERENCE NUMBERS

1 Feed
2 Separator internal chamber
3 Rear separator area
4 External wall side of the flow wall
5 Internal wall side of the flow wall
6 Flow elements
7, 7' Tapering region
8 Separator area of large oil drops
9 First hole element in the direction of flow
10 Second hole element in the direction of flow
11 Third hole element in the direction of flow
12 Fourth hole element in the direction of flow
14 Outlet
15 Outlet pipe
16 Sludge collection chamber
17 Container wall
18 Coarse dirt trap
19 Delimiting element (base plate)
30 Connector from the outlet to the outlet pipe
45 Separator external chamber
50 Separator
52 First side of the container
53 Second side of the container
60 Feed chicane
65 Lower edge feed
70 First flow channel
71 Second flow channel
75, 75' First flow parts
76, 76' Second flow parts
80 Flow wall
83 Opening of flow wall

The invention claimed is:

1. Separator, which is arranged in a container having a circular or ellipsoidal cross section and having a container wall, for separating a light liquid-water mixture, comprising:
    a feed arranged on a first side of the container having a feed chicane, which directs the supplied mixture downward and divides it into two first flow parts that are substantially of equal size,
    an outlet having an outlet tube,
    a flow wall having a circular or ellipsoidal cross section having an internal wall side and an external wall side, wherein the flow wall passes through at least half of a full circle, and has an opening which is facing a second side of the container opposite the feed,
    wherein the flow wall between the external wall side of the flow wall and the container wall forms two flow channels at two opposite sides of the container wall in each case from the feed to the second side of the container, wherein in the flow channels in each case one of the two first flow parts is conducted from the feed to the second side of the container along the container wall, wherein the two first flow parts at the second side of the container having substantially opposite directions of flow meet one another and are reunited, and
    hole elements arranged in the two flow channels, through which the two first flow parts flow.

2. Separator according to claim 1, wherein the outlet is arranged at substantially the same height as the feed.

3. Separator according to claim 1, wherein in each case at least the first of the hole elements is arranged in the direction of flow of the respective first flow part in the respective flow channel such that a part of the first hole element is disposed above an lower edge of the feed to form a rotating flow of the respective first flow part between the part of the first hole element disposed above the lower edge of the feed and the feed .

4. Separator according to claim 1, wherein flow elements are arranged at the outlet , in particular at the outlet tube of the outlet , to re-divide the reunited first flow parts into two second flow parts that are substantially of equal size and to direct the two second flow parts through a tapering region in each case and from the second side along the internal wall side of the flow wall in the direction of the first side of the container, wherein the two second flow parts having substantially opposite directions of flow meet one another and are reunited at the internal wall side of the flow wall at the first side of the container.

5. Separator according to claim 1, wherein flow elements are arranged at the opening of the flow wall as an extension of the flow wall to create a rotating flow of the two first flow parts and/or the two reunited first flow parts at the second side of the container, to re-divide the reunited first flow parts into two second flow parts that are substantially of equal size and to direct the two second flow parts through a tapering region in each case and from the second side along the internal wall side of the flow wall in the direction of the first side of the container, wherein the two second flow parts having substantially opposite directions of flow meet one another and are reunited at the internal wall side of the flow wall at the first side of the container.

6. Separator according to claim 1, wherein flow elements are arranged at the opening of the flow wall to re-divide the reunited first flow parts into two second flow parts that are substantially of equal size, to direct a part of the two second flow parts through a tapering region in each case and from the second side along the internal wall side of the flow wall in the direction of the first side of the container and to direct a part of the respective second flow parts below the flow elements, wherein at least parts of the two second flow parts having substantially opposite directions of flow meet one another and are reunited at the internal wall side of the flow wall at the first side of the container.

7. Separator according to claim 1, wherein the outlet is arranged substantially in the middle of the container.

8. Separator according to claim 1, wherein the separator is embodied substantially with mirror symmetry with respect to a plane through the feed and the outlet.

9. Separator according to claim 1, wherein a coarse dirt trap is arranged around the outlet.

10. Separator according to claim 9, wherein the coarse dirt trap is round, rectangular, or ellipsoidal.

11. Separator according to claim 1, wherein at least the surface of the hole elements and/or the flow elements and/or the internal and/or the external wall side of the flow wall is made of an oleophilic material.

12. Separator according to claim 11, wherein the oleophilic material is HDPE.

13. Separator according to claim 1, wherein at least a part of the respective flow channel is delimited by a delimiting element in the direction of a base of the container.

14. Separator according to claim 1, wherein a sludge collection chamber is arranged on a base of the container to gather and collect coarse sludge and/or heavy sediments.

15. Separator according to claim 1, wherein at least one of the hole elements and/or the flow elements only extends over a part of a height of the container.

16. Method for separating a light liquid-water mixture, for example of oil-polluted water, in a separator an internal chamber and an external chamber comprising the following steps:
feeding the mixture through a feed arranged on a first side of the separator,
directing the oil and water mixture downward and dividing the mixture into two first flow parts of approximately equal size with a feed chicane,
causing the two first flow parts to flow through a plurality of hole elements in two flow channels arranged in the external chamber,
reuniting the two first flow parts on a second side of the separator opposite to the first side opposite in that the two first flow parts having substantially opposite directions of flow meet one another,
re-dividing the mixture of the two reunited first flow parts into two second flow parts that are substantially of equal size and directing the two second flow parts into the internal chamber in the direction of the feed,
reuniting at least parts of the two second flow parts in the internal chamber at the first side of the separator by the meeting of at least parts of the two second flow parts having substantially opposite directions of flow and
discharging the water from the internal chamber through an outlet.

* * * * *